US011867860B2

(12) United States Patent
Morris et al.

(10) Patent No.: US 11,867,860 B2
(45) Date of Patent: Jan. 9, 2024

(54) SEISMIC DATA ACQUISITION UNIT

(71) Applicant: Magseis FF LLC, Houston, TX (US)

(72) Inventors: Michael Morris, Sugar Land, TX (US); Sam Hand, Houston, TX (US)

(73) Assignee: Magseis FF LLC, Houston, TX (US)

( * ) Notice: Subject to any disclaimer, the term of this patent is extended or adjusted under 35 U.S.C. 154(b) by 647 days.

(21) Appl. No.: 16/790,184

(22) Filed: Feb. 13, 2020

(65) Prior Publication Data

US 2020/0183037 A1 Jun. 11, 2020

Related U.S. Application Data

(63) Continuation of application No. 16/003,226, filed on Jun. 8, 2018, now Pat. No. 10,571,588.

(60) Provisional application No. 62/517,778, filed on Jun. 9, 2017.

(51) Int. Cl.
*G01V 1/38* (2006.01)
*G01V 1/16* (2006.01)

(52) U.S. Cl.
CPC .............. *G01V 1/3808* (2013.01); *G01V 1/16* (2013.01); *G01V 1/3843* (2013.01); *G01V 2210/1423* (2013.01)

(58) Field of Classification Search
None
See application file for complete search history.

(56) References Cited

U.S. PATENT DOCUMENTS 2,348,225 A 5/1944 Petty
2,590,530 A 3/1952 Groenendyke
2,590,531 A 3/1952 McLoad
2,748,370 A * 5/1956 Baltosser ............... G01V 1/181
367/187
2,890,438 A 6/1959 Bardeen et al.
(Continued)

FOREIGN PATENT DOCUMENTS

CN 101365964 A 2/2009
CN 102084269 A 6/2011
(Continued)

OTHER PUBLICATIONS

"Yokowo Spring Loaded Connector", retrieved Oct. 2, 2019 from URL: https://web.archive.org/web/2014082240/https://www.yokowoconnector.com/technology.content_02/index2.html (2 pages).

(Continued)

*Primary Examiner* — Isam A Alsomiri
*Assistant Examiner* — Jonathan D Armstrong
(74) *Attorney, Agent, or Firm* — Sage Patent Group

(57) ABSTRACT

The present disclosure is directed to systems and methods to perform or facilitate operation of a seismic survey. The system can include a seismic data acquisition unit. The seismic data acquisition unit can include a cap free subsea connector. The connector can be formed of a snap ring, pin interconnect and socket insert. The snap ring can contact the pin interconnect. The pin interconnect can contact the socket insert. The socket insert can be in contact with isolation electronics within the seismic data acquisition unit. The snap ring can lock or keep the pin interconnect in contact with the socket insert. The pin interconnect can be removable and replaceable.

20 Claims, 10 Drawing Sheets

(56) References Cited

U.S. PATENT DOCUMENTS

| | | | |
|---|---|---|---|
| 3,289,155 A | | 11/1966 | Parrack et al. |
| 3,855,566 A | | 12/1974 | Richardson |
| 3,863,200 A | | 1/1975 | Miller |
| 4,092,629 A | | 5/1978 | Siems et al. |
| 4,193,655 A | * | 3/1980 | Herrmann, Jr. ...... H01R 13/502 439/271 |
| 4,477,022 A | * | 10/1984 | Shuey ................. H01R 13/422 439/314 |
| 4,631,711 A | | 12/1986 | Fowler |
| 4,725,995 A | | 2/1988 | Fowler |
| 5,943,293 A | | 8/1999 | Luscombe et al. |
| 6,288,972 B1 | * | 9/2001 | Norris ..................... G01V 1/16 367/16 |
| 6,301,195 B1 | | 10/2001 | Faber |
| 6,482,036 B1 | | 11/2002 | Broussard |
| 7,646,670 B2 | | 1/2010 | Maxwell et al. |
| 11,061,157 B2 | * | 7/2021 | Fyffe ..................... G01V 1/247 |
| 11,662,494 B2 | * | 5/2023 | Fyffe ..................... G01V 1/3817 367/16 |
| 2002/0185327 A1 | * | 12/2002 | Morykon ................. H02G 3/22 180/312 |
| 2005/0052921 A1 | | 3/2005 | Butterworth et al. |
| 2006/0046535 A1 | * | 3/2006 | Iida ......................... H05K 5/062 439/76.1 |
| 2006/0133201 A1 | | 6/2006 | Chamberlain et al. |
| 2006/0201243 A1 | * | 9/2006 | Auffret ..................... G01V 1/38 73/170.29 |
| 2006/0245300 A1 | * | 11/2006 | De Kok ..................... G01V 1/16 367/15 |
| 2007/0025809 A1 | | 2/2007 | Lee et al. |
| 2008/0080318 A1 | * | 4/2008 | Maxwell ..................... G01V 1/38 367/131 |
| 2013/0189869 A1 | | 7/2013 | Cameron et al. |
| 2014/0219051 A1 | | 8/2014 | Pavel |
| 2014/0254315 A1 | * | 9/2014 | Rigsby .................. G01V 1/3835 367/15 |
| 2015/0362606 A1 | | 12/2015 | Henman et al. |
| 2016/0015885 A1 | | 1/2016 | Pananen et al. |
| 2016/0041280 A1 | * | 2/2016 | Naes ..................... G01V 1/38 367/149 |
| 2016/0041284 A1 | | 2/2016 | Rokkan et al. |
| 2016/0056645 A1 | * | 2/2016 | Henman ................. G01V 1/247 320/112 |
| 2016/0109588 A1 | | 4/2016 | Mellier et al. |
| 2016/0202380 A1 | * | 7/2016 | Olivier ................. G01V 1/3808 367/15 |
| 2016/0349386 A1 | * | 12/2016 | Naes ..................... G01V 1/166 |
| 2016/0349387 A1 | * | 12/2016 | Rokkan ................. H01R 13/523 |
| 2017/0017009 A1 | | 1/2017 | Olsson et al. |
| 2017/0123091 A1 | * | 5/2017 | Stewart ................. G01V 1/3852 |
| 2019/0302301 A1 | * | 10/2019 | Fyffe ..................... G01V 1/3852 |
| 2021/0333427 A1 | * | 10/2021 | Fyffe ..................... G01V 1/3852 |

FOREIGN PATENT DOCUMENTS

| | | | |
|---|---|---|---|
| CN | 202067958 | | 12/2011 |
| CN | 103969681 A | | 8/2014 |
| CN | 104854477 A | | 8/2015 |
| EP | 1058130 A2 * | 12/2000 | ............... G01V 1/16 |
| EP | 3 101 449 A1 | | 12/2016 |
| WO | WO-2006/041438 A1 | | 4/2006 |
| WO | WO-2008/042556 A2 | | 4/2008 |
| WO | WO-2014/093292 A1 | | 6/2014 |

OTHER PUBLICATIONS

Final Office Action for U.S. Appl. No. 16/003,226 dated Jun. 27, 2019 (16 pages).

International Preliminary Report on Patentability and Written Opinion of the International Searching Authority for PCT/US2018/036618 dated Dec. 19, 2019 (6 pages).

International Search Report and Written Opinion of the International Searching Authority for PCT/US2018/036618 dated Aug. 7, 2018 (6 pages).

Non-Final Office Action for U.S. Appl. No. 16/003,226 dated Feb. 26, 2019 (13 pages).

Notice of Allowance for U.S. Appl. No. 16/003,226 dated Oct. 25, 2019 (8 pages).

Olofsson, Bjorn, "Ocean Bottom Node Acquisition" Presentation Slides, Fugro, dated Mar. 8, 2012 (57 pages).

Vasilescui et al. "Autonomous Modular Optical Underwater Robot (AMOUR) Design, Prototype and Feasibility Study", Proceedings of the 2005 IEEE, International Conference on Robotics and Automation, Barcelona, Spain, Apr. 2005, pp. 1603-1609 (7 pages).

Extended European Search Report for EP 18814442.2 dated Feb. 2, 2021 (8 pages).

First Office Action dated Mar. 11, 2022 for Chinese Application No. 201880051300.9, 6 pages.

* cited by examiner

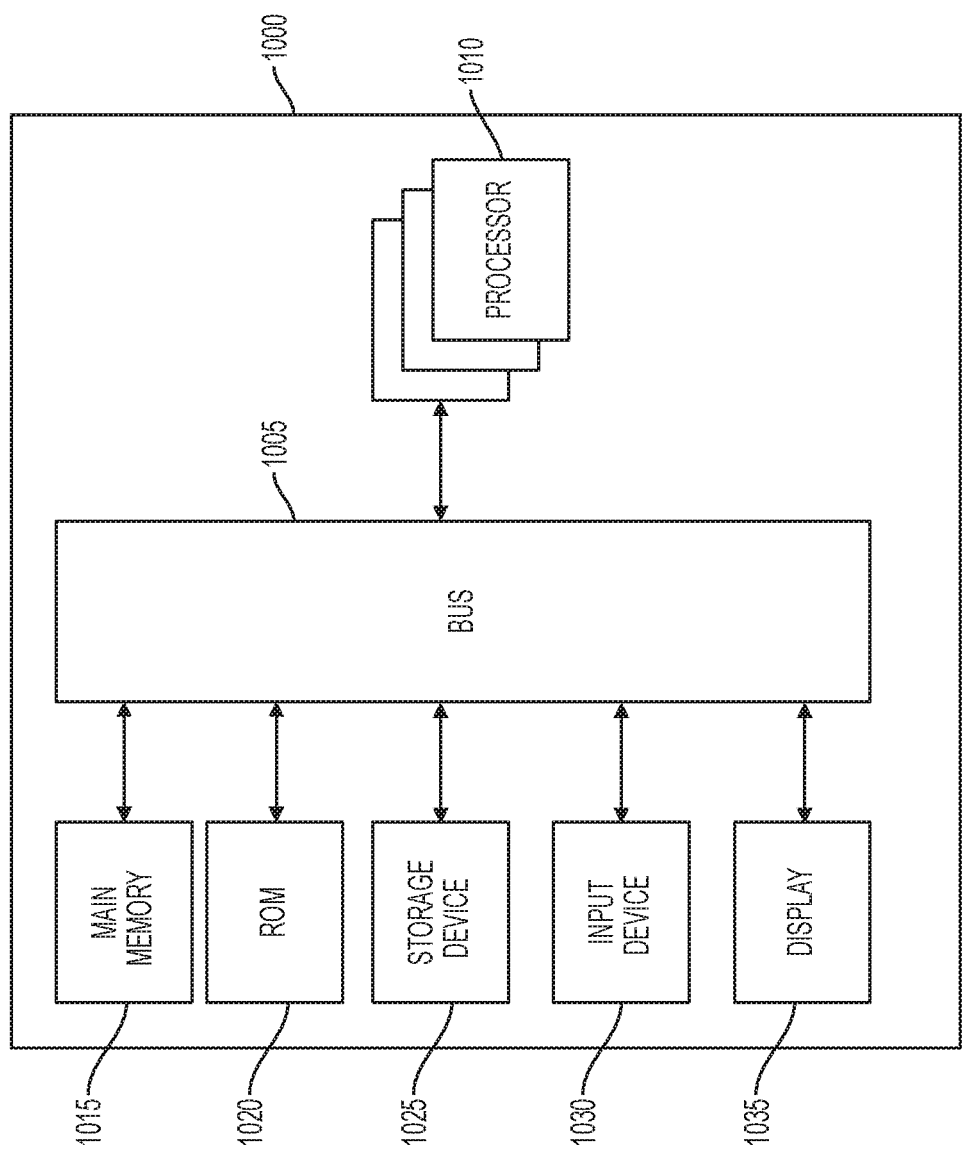

SEISMIC DATA ACQUISITION UNIT

CROSS-REFERENCES TO RELATED APPLICATIONS

This application claims the benefit of priority under 35 U.S.C. § 120 as a continuation of U.S. patent application Ser. No. 16/003,226, filed Jun. 8, 2018, which claims the benefit of priority under 35 U.S.C. § 119 to U.S. Provisional Patent Application No. 62/517,778, filed Jun. 9, 2017, each of which is incorporated by reference herein in its entirety.

BACKGROUND

A seismic data acquisition system can acquire seismic data relating to subsurface features, such as lithological formations or fluid layers that may indicate the presence of hydrocarbons, minerals or other elements. An acoustic signal can penetrate the surface of the earth. The acoustic signal can reflect or refract off of subsurface lithological formations. The reflected or refracted acoustic signals can be acquired, analyzed, and interpreted to indicate physical characteristics of, for example, the lithological formations such as the presence of hydrocarbons.

SUMMARY

The present disclosure is directed to systems and methods for acquiring seismic data via a seismic data acquisition unit. Due to the large number of seismic data acquisition units (or receivers) that are used to collect seismic data, it can be challenging to efficiently store or deploy seismic data acquisition units, maintain seismic data acquisition units, as well as retrieve data stored on the seismic data acquisition unit or otherwise connect with the seismic data acquisition unit. Further, inefficiencies related to maintaining seismic data acquisition units can result in improper or incomplete maintenance, or maintenance not being performed, which can damage the seismic data acquisition unit.

Systems and methods of the present disclosure solve these and other problems associated with performing a seismic survey. For example, a system can provide a cap free sub-sea connector on the seismic data acquisition unit that can provide both maintenance and time efficiencies to operations related to performing a seismic survey. The cap free subsea connector of the present disclosure can function without a protective pressure cap, minimize or eliminate maintenance, be field-repairable, and support connection automation.

At least one aspect is directed to a system to perform or facilitate operation of a seismic survey. The system can include a seismic data acquisition unit. The seismic data acquisition unit can include a cap free subsea connector. The connector can be formed of a snap ring, pin interconnect and socket insert. The snap ring can contact the pin interconnect. The pin interconnect can contact the socket insert. The socket insert can be in contact with isolation electronics within the seismic data acquisition unit. The snap ring can lock or keep the pin interconnect in contact with the socket insert. The pin interconnect can be removable and replaceable.

At least one aspect is directed to a method of performing or facilitating operation of a seismic survey. The method can include providing a seismic data acquisition unit with a cavity in which a connector can be placed. The method can include inserting a replaceable pin interconnect into the cavity to contact isolation electronics within the seismic data acquisition unit. The method can include locking the pin interconnect to the socket insert using a snap ring, the snap ring in contact with the pin interconnect. The method can also include removing the snap ring and using a removal tool to remove the pin interconnect.

At least one aspect is directed to a system to stack seismic data acquisition units. The system can include a plurality of seismic data acquisition unit, where each seismic data acquisition unit includes cleat rings (or a set of cleat rings). The set of cleat rings can be formed of two rings of inner and outer cleats, where the cleats are staggered by a predetermined degree. The cleat rings can facilitate orienting the seismic data acquisition unit as they are stacked, and also interlocking the seismic data acquisition unit to one another to keep rotation of the units relative to one another below a threshold.

At least one aspect is directed to a method of stacking seismic data acquisition units. The method can include placing a first seismic data acquisition unit having a cleat ring on top of a second seismic data acquisition unit having a cleat ring such that the cleat rings can align and interlock via gravity with one another. The method can further include utilizing an alignment mechanism, such as a magnet, to align each connector on each seismic data acquisition unit.

At least one aspect is directed to system to perform a seismic survey. The system can include a first seismic data acquisition unit. The first seismic data acquisition unit can include a connector located on a first side of the first seismic data acquisition unit. The connector can connect with a cable to transfer seismic data via the cable. The connector can include a snap ring, a pin interconnect, and a socket insert. The snap ring can contact the pin interconnect and lock the pin interconnect in contact with the socket insert. The socket insert can contact electronic circuitry located within the first seismic data acquisition unit. A first set of cleat rings can be located on a second side of the first seismic data acquisition unit. The first set of cleat rings can include inner cleat rings and outer cleat rings. The first set of cleat rings can orient the first seismic data acquisition unit when stacked with a second seismic data acquisition unit having a second set of cleat rings. The first side having the connector can be in a different plane than the second side having the first set of cleat rings.

At least one aspect is directed to a method of performing a seismic survey. The method can include providing, on a marine vessel, a first seismic data acquisition unit stored in a stack of a plurality of seismic data acquisition units. The first seismic data acquisition unit can include a connector located on a first side of the first seismic data acquisition unit. The connector can connect with a cable to transfer seismic data via the cable. The connector can include a snap ring, a pin interconnect, and a socket insert. The snap ring can contact the pin interconnect and lock the pin interconnect in contact with the socket insert. The socket insert can contact electronic circuitry located within the first seismic data acquisition unit. The first seismic data acquisition unit can include a first set of cleat rings located on a second side of the first seismic data acquisition unit. The first set of cleat rings can include inner cleat rings and outer cleat rings. The first set of cleat rings can orient the first seismic data acquisition unit when stacked with a second seismic data acquisition unit of the plurality of seismic data acquisition units having a second set of cleat rings. The first side having the connector can be in a different plane than the second side having the first set of cleat rings. The method can include deploying, from the stack on the marine vessel into an aqueous medium, the first seismic data acquisition unit absent a cap on the connector.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 10 depicts a block diagram of an architecture for a computing system employed to implement various elements of the systems or components depicted in FIGS. 1-9 and 9.

Like reference numbers and designations in the various drawings indicate like elements.

DETAILED DESCRIPTION

The present disclosure is directed to systems and methods that improve operations related to performing a seismic survey. For example, systems and methods of the present disclosure can allow for efficient storage and maintenance of seismic data acquisition units, thereby reducing damage to the seismic data acquisition units and reducing resource consumption.

Figure 1:
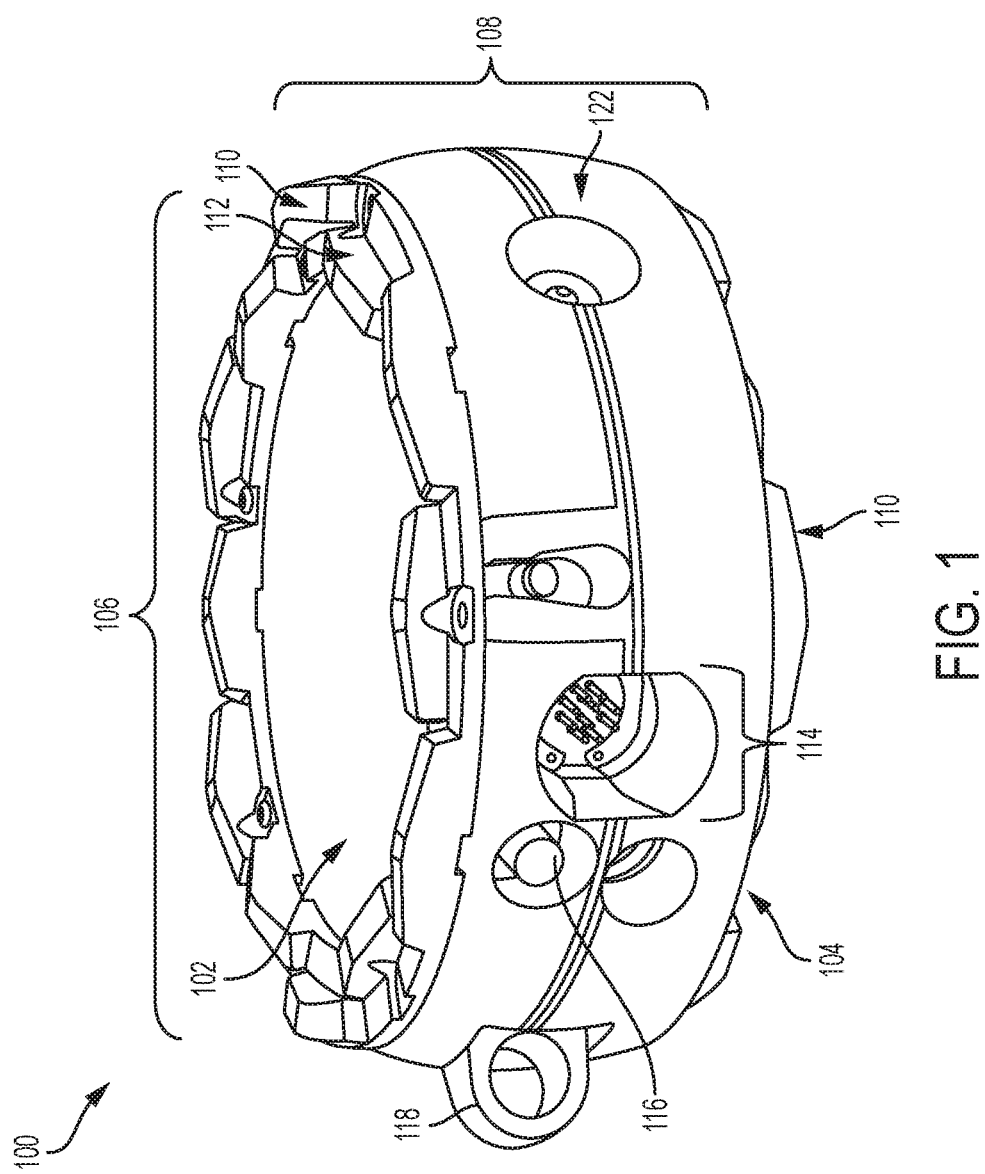
FIG. 1 depicts an illustration of a seismic data acquisition unit, in accordance with an implementation.

FIG. 1 depicts an illustration of a seismic data acquisition unit, in accordance with an implementation. The system can include the seismic data acquisition unit 100. The seismic data acquisition unit 100 can include a connector 114, such as cap free sub-sea connector, on the seismic data acquisition unit 100 that provides both maintenance and time efficiencies to operations related to performing a seismic survey. The connector 114 can function without a protective pressure cap, minimize or eliminate maintenance, be field repairable, and support connection automation. The connector 114 can be positioned on a portion of the seismic data acquisition unit 100. The connector 114 can be placed on side 122 of the seismic data acquisition unit 100. The side 122 of the seismic data acquisition unit can be on a different plane as the top side (e.g., first side 102) or bottom side (e.g., second side 104). For example, the side 122 can be perpendicular (or substantially perpendicular such as 60 to 120 degrees) to at least one of the first side 102 or the second side 104.

The seismic data acquisition unit 100 can have a first side 102. The first side 102 can be referred to as a top side. The seismic data acquisition unit can have a second side 104, which can be referred to as a bottom side. The seismic data acquisition unit 100 can be disk shaped. For example, the seismic data acquisition unit 100 can have a width or diameter 106 that is greater than a height 108. For example, the diameter 106 (or width) can range from 10 inches to 30 inches. The height can range from 5 inches to 20 inches. In some cases, the diameter can be less than or equal to 20 inches, and the height can be less than or equal to 10 inches. For example, a configuration of the seismic data acquisition unit 100 can include a diameter of 19.9 inches and a height of 10 inches; a diameter of 21 inches and a height of 10.5 inches; a diameter of 12 inches and a height of 4 inches; or a diameter of 17 inches and a height of 6 inches, for example. The seismic data acquisition unit 100 can be circular, rectangular, oval, octagonal, pentagonal, polygonal, or have another shape that facilitates seismic data acquisition.

The seismic data acquisition unit 100 can include first cleats 110 and second cleats 112. The first cleats 110 can form a first cleat ring, and the second cleats 112 can form a second cleat ring. First cleats 110 can be referred to as outer cleats, and second cleats 112 can be referred to as inner cleats. The outer cleats can be positioned on a perimeter of the seismic data acquisition unit 100, while the inner cleats can be form an inner cleat ring adjacent or proximate to the outer cleats. The first and second cleat rings can be coupled to the first side 102 of the seismic data acquisition unit 100. The first and second cleat rings can be coupled to the second side 104 of the seismic data acquisition unit 100. The cleats 110 and 112 can be positioned such that they do not overlap.

The seismic data acquisition unit 100 can include a coupling mechanism 118. The coupling mechanism 118 can include a component configured to facilitate coupling the seismic data acquisition unit 100 or facilitate deployment or storage of the seismic data acquisition unit 100. For example, the coupling mechanism 118 can include a ring through which a cable (e.g., cable 44A or cable 70 depicted in FIG. 9) can be inserted in order to facilitate deploying the seismic data acquisition unit 100.

The seismic data acquisition unit 100 can include a transceiver 116. The transceiver 116 can include a transmitter or a receiver. The transceiver 116 can include a transducer. The transceiver 116 can transmit or receive acoustic signals or radio frequency signals. The transceiver 116 can include a beacon. The transceiver 116 can facilitate location detection, positioning, or the transmission of information related to seismic operations, such as seismic data, status information, or quality assessment.

Figure 2:
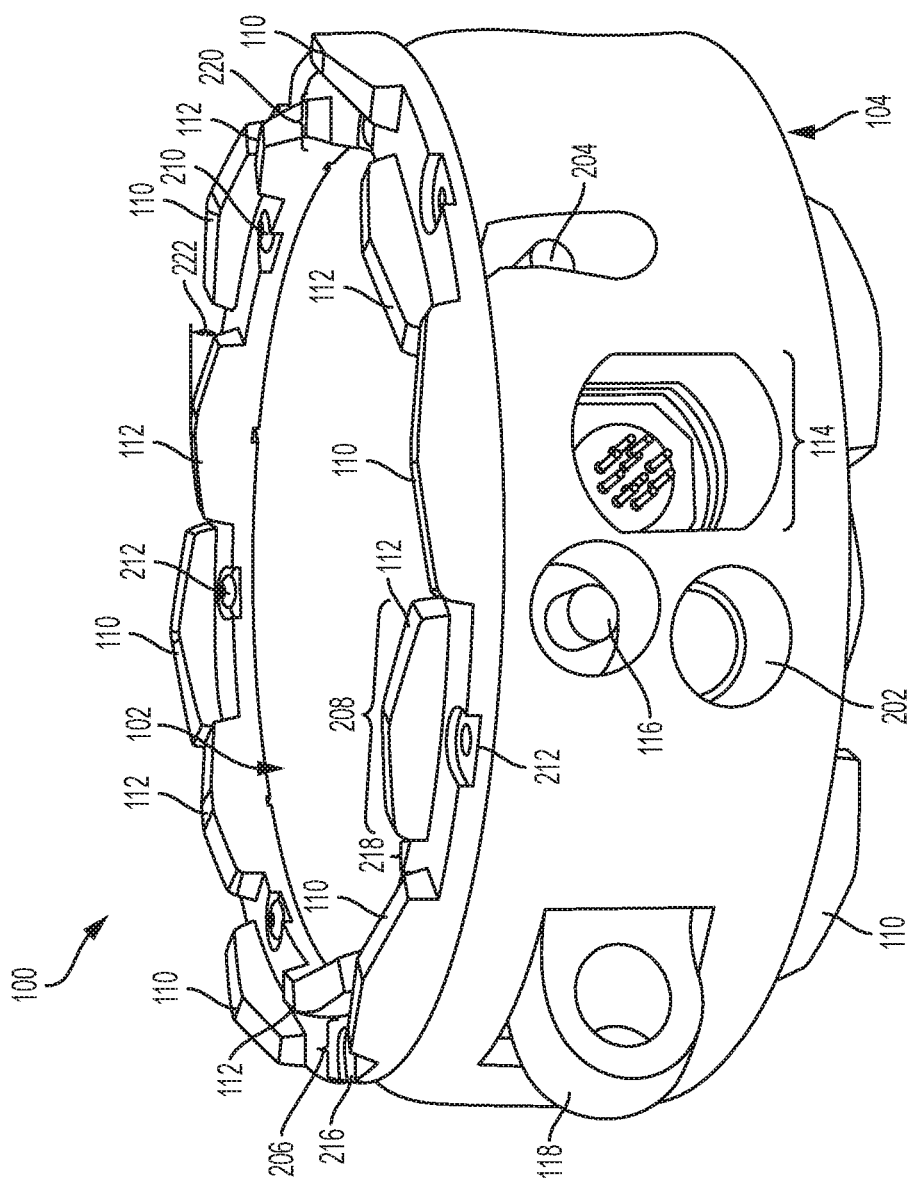
FIG. 2 depicts an illustration of a seismic data acquisition unit, in accordance with an implementation.

FIG. 2 depicts an illustration of a seismic data acquisition unit, in accordance with an implementation. The top side 102 and the bottom side 104 can include cleat rings formed from first cleats 110 and second cleats 112. The first cleats 110 can be outer cleats. For example, the first cleats 110 can be further from a center of the seismic data acquisition unit 100 than the second cleats 112. The first cleats 110 can be closer to a perimeter of the seismic data acquisition unit 100 as compared to the second cleats 112. The second cleats 112 can be positioned a distance 206 from the edge 216 or perimeter of the seismic data acquisition unit 100. The distance 206 can range from 0.05 inches to 10 inches or more. The distance 206 can be based on a width or thickness of the first cleats 110. Distance 206 can be greater than or equal to the width or thickness of the first cleats 110 or width 206 of the second cleats 112. The first cleat 110 can be separated from the second cleat 112 by a distance 218. The distance 208 can be 0.001 inches to 10 inches or more.

The first cleats 110 and second cleats 112 can have a length 208. The length 208 can range from 0.05 inches to 10 inches or more. The first cleats 110 and second cleats 112 can each have a width 220, which can range from 0.01 inches to 5 inches or more. The cleats 110 or 112 can have a portion that forms an angle 222 with respect to a tangent that extends from a point on the cleat 110 or 112. The angle 222 can range from 0.1 degrees to 80 degrees or more.

The seismic data acquisition unit 100 can include coupling mechanism 210. The coupling mechanism 210 can couple the cleats 110 and 112 to the first side 102 of the seismic data acquisition unit 100. Similarly, coupling mechanism 210 can couple cleats 110 and 112 to the second side 104 of the seismic data acquisition unit 100. The coupling mechanism 210 can include screws, nuts, bolts, pins, latches, adhesives, magnets or other coupling mechanism.

The seismic data acquisition unit 100 can include openings 212. The openings 212 can receive coupling mechanisms 210. The openings 212 can be used to grab or latch on to the seismic data acquisition unit 100. In some cases, the openings 212 can facilitate stacking seismic data acquisition units 100.

The seismic data acquisition unit 100 can include a transceiver 116. The seismic data acquisition unit 100 can include an optical transceiver 202. The optical transceiver 202 can include a transmitter or receiver. The seismic data acquisition unit 100 can include a cap free subsea connector 114. The seismic data acquisition unit 100 can include a transmitter 204. The connector 114 can be placed on a side of the seismic data acquisition unit 100. The connector 114 can be placed on a side 122 that is not the first side 102 or the second side 104.

Figure 3:
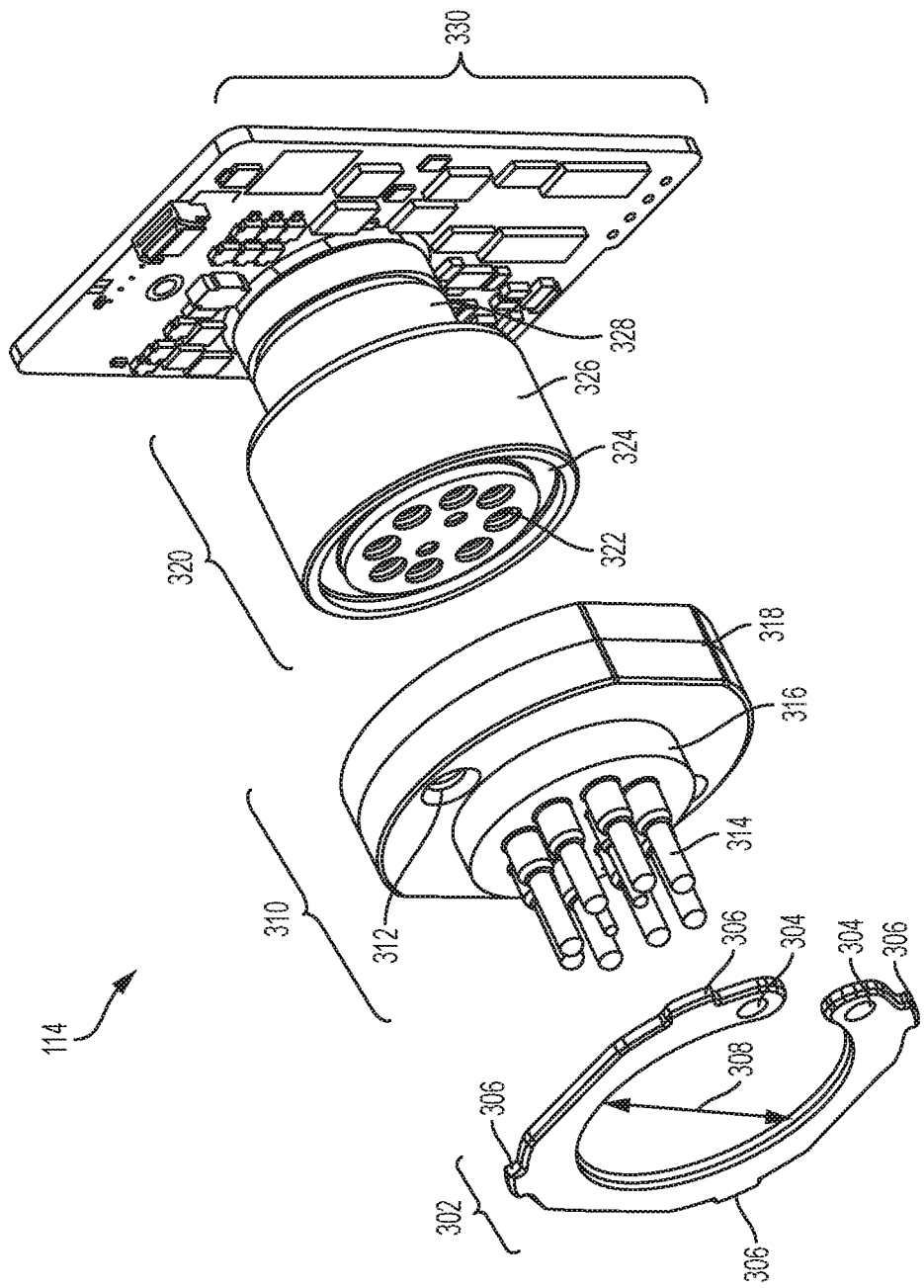
FIG. 3 depicts an illustration of a connector of a seismic data acquisition unit, in accordance with an implementation.

FIG. 3 depicts an illustration of a connector of a seismic data acquisition unit, in accordance with an implementation. The connector 114, or cap free subsea connector, can be illustrated as three components, such as a snap ring 302, pin interconnect 310 and socket insert 320. The socket insert 320 can be coupled to, or in contact with, isolation electronics 330. Isolation electronics 330 can include electronic circuitry, circuits, digital components, a printed circuit board, or other electronics. The socket insert 320 can be depth rated, for example for subsea depths that are at or near the ocean floor or seabed. The pin interconnect 310 can be field replaceable.

The connector 114 can be designed and constructed to be cap free, thereby reducing the amount of space the seismic data acquisition unit 100 occupies, either in a storage container or transfer container. Removing the cap can also allow for easier access to the electronic circuitry and allow an electrical communication to be established faster and more easily.

The connector is further designed and constructed to allow the pins 314 to be replaceable. In some cases, the pins 314 can be field replaceable. To achieve this, the connector 114 can be divided into two parts, the pin interconnect 310 and the socket insert 320. The socket insert 320 can provide a satisfactory pressure rating for the operational depth requirements (e.g., ocean seabed) of the seismic data acquisition unit 100, and thus protect the internal electronics and stored survey data. The pin interconnect 310 can connect the seismic data acquisition unit 100 electronics to the shipside electronics for functions (e.g., seismic data retrieval, quality assessment, or status checks) and provide a field replaceable component if the contacts (e.g., pins 314) are damaged. Field replacement of the pin interconnect 310 can be achieved by the removal of the snap ring 302, cleaning the face seal 318, and installing a new seal (e.g., seal 318) and pin interconnect 310. The connector 114 can be designed to be symmetric about the horizontal axis (e.g., axis 514 illustrated in FIG. 5A) through the center two contacts. This design can allow for the shipside connection to be made in either of two orientations 180° apart thus facilitating back deck automation goals.

The snap ring 302 can be formed of plastic or any other material that facilitates holding the pin interconnect in place in subsea pressure and sea water. The snap ring 302 can be popped or placed into a groove on the housing of the seismic data acquisition unit 100. The snap ring 302 can be shaped as a ring, horseshoe design or other shape. The snap ring 302 can include protrusions 306 that can facilitate holding or locking the snap ring into place in the seismic data acquisition unit 100, or housing thereof. The snap ring 302 can have a diameter (or a portion of the snap ring can have a width) 308, that can range from 0.05 inches to 10 inches or more.

The snap ring 302 can include openings 304 configured to lock the snap ring 302 in place. The openings 304 can facilitate removing the snap ring 302, for example via insertion of a removal tool into opening 304. The opening 304 can be threaded.

The pin interconnect 310 can include a seal surface 318. The pin interconnect 310 can include a rubber boot 316. In a marine environment, water can be present causing electric shorting between the pin contacts 314. To prevent this, a rubber boot 316 present on both the pin interconnect 310 and the shipside mating connector to "squeeze" off or dispel the water as the connecting is made and prevent the shorting of the contacts. The rubber boot 316 can provide a cushion for a cable that connects to the pins 314. The rubber boot 316 can dampen the force that results from the cable connecting or physically engaging or mating with the pins 314. The rubber boot 316 can be formed of rubber or other material that can deform responsive to physical force or contact, and absorb the impact force or attenuate the impact force to protect the isolation electronics 330 or other components of the seismic data acquisition unit 100.

The pin interconnect can include a plurality of pins 314. The pins 314 can be gold plated or coated with other types of metals, materials, polymers that can improve the longevity of the pins. The pins 314 can be coated with a material that mitigates corrosion. However, since the pins 314 may corrode even with such material, the pins 314 can be replaced. The pin interconnect 310 can be replaceable and be referred to as a sacrificial portion of the connector 114 because the pin interconnect 310, or portion thereof, can be replaced upon corrosion or damage to a portion thereof.

The pin interconnect 310 can include an opening 312. The opening 312 can be a removal tool insert. The opening 312 can be threaded. The opening 312 can facilitate the replacement of the pin interconnect 310. For example, a removal tool, such as a threaded cylinder or screw, can be inserted into opening 312. While the tool is inserted or threaded in opening 312, the tool can detach the pin interconnect from the socket insert 320.

The socket insert 320 can be coupled to, or in contact with, the isolation electronics 320. The pin interconnect can be coupled to, or in contact with, the socket insert 320. The pin interconnect 310 can be removably coupled to, or in contact with, the socket insert 320. The snap ring 302 can be coupled to, or in contact with, the pin interconnect 310. The snap ring can be removably coupled to the pin interconnect 310.

The socket insert 320 can include a plurality of sockets 322. The sockets 322 can be surrounded by a socket o-ring groove 324 in which an o-ring can be placed in order to facilitate providing a pressure and water seal. The o-ring groove 324, in which an o-ring can be placed, can facilitate the prevention of water from contacting the isolation electronics 330.

The socket insert 320 can include a seal surface 326. The socket insert can include a surface 328. The portion of the socket insert 326 can be wider or having a greater diameter as compared to the portion 328 of the socket insert 320. For example, the socket insert 320 can taper from portion 326 to portion 328, where portion 328 is closer to the isolation electronics 330 as compared to the portion 326, which can be closer to the pin interconnect 310.

The isolation electronics 330 can allow the pins 314 or contacts to be exposed to the salt water environment and not have premature corrosion by electrically isolating the pins 314 from electronics in the seismic data acquisition unit 100 so as to create a zero or near zero (e.g., 10 millivolts, 1 millivolt, 0.1 millivolt, 0.01 millivolt, 0.001 millivolt, 0.0001 millivolt, 0.00001 millivolt or less) electrical potential between themselves and the outside environment. Without this isolation, the contacts may create a circuit through which current would flow and erode the pins 314 or contacts. By design, the pins 314 can be isolated from each other by the insert material.

Since the function of the connector 114 is to allow the shipside electronics to have electrical connectivity to the electronics inside the seismic data acquisition unit 100, the isolation circuit 330 can be configured to both isolates the pins 314 and connect the pins 314 when appropriate.

Figure 4:
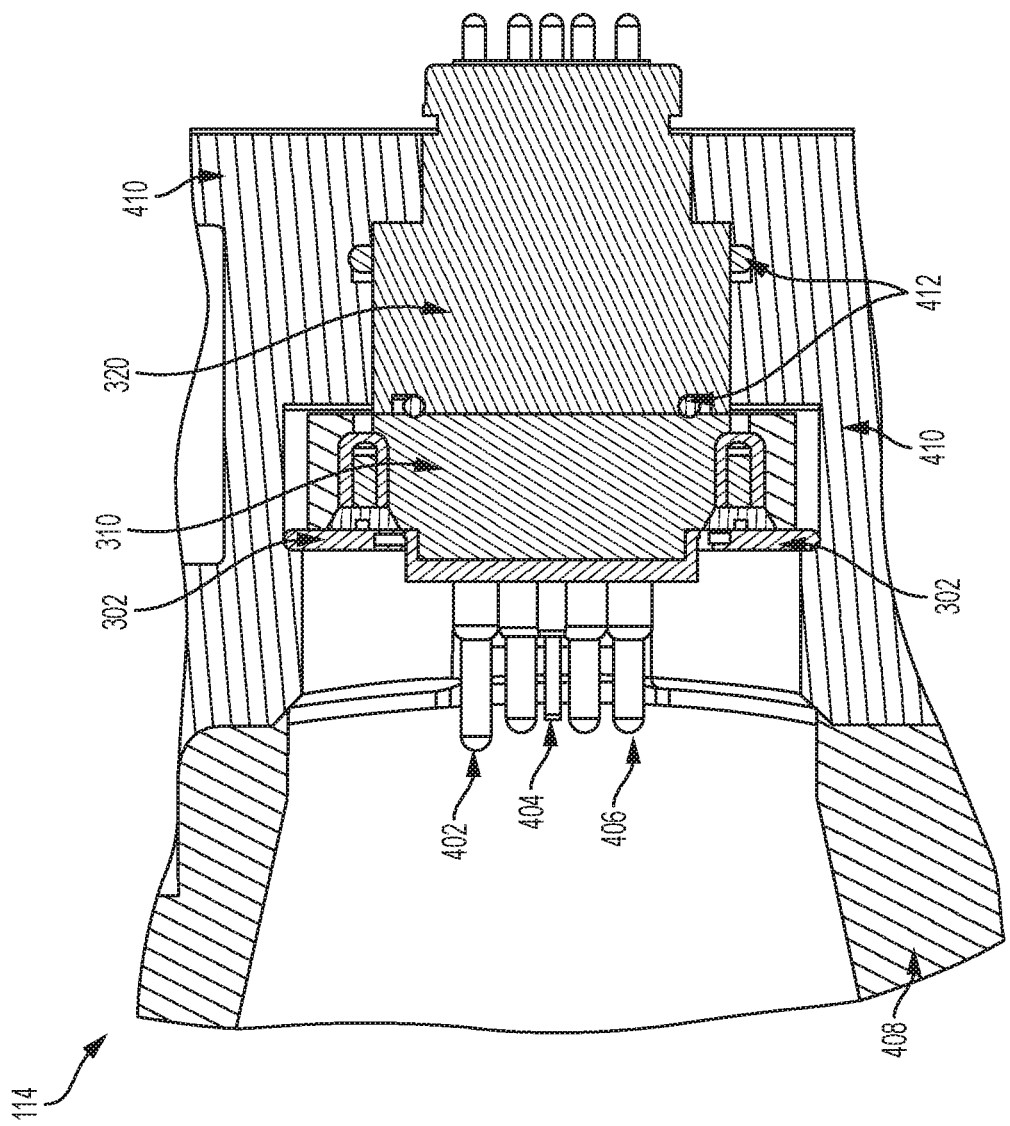
FIG. 4 depicts an illustration of a connector of a seismic data acquisition unit, in accordance with an implementation.

FIG. 4 depicts an illustration of a connector of a seismic data acquisition unit, in accordance with an implementation. FIG. 4 provides a side perspective view of the connector 114. FIG. 4 provides a slice, cross-sectional view of connector 114 in the seismic data acquisition unit 100. For example, the connector 114 can be in the housing 410 of the seismic data acquisition unit 100. The snap ring 302 is placed around the pin interconnect 310. The socket insert 320 is in contact with the pin interconnect 310. The socket insert 320 can also be in contact with the housing 410. An o-ring 412 can surround or encircle the socket insert 320. Another o-ring 412 can be positioned between the pin-interconnect 310 and the socket insert. For example, an o-ring 412 can be placed in o-ring groove 324 illustrated in FIG. 3. The pins 402, 404 and 406 can extend from the pin interconnect 310. The connector 114 can be provided within the housing 410. A portion 408 can be referred to as a bumper, which can refer to an external portion of the seismic data acquisition unit 100. The bumper portion 408 can form a cavity in seismic data acquisition unit 100 in which the connector 114 is formed or placed or constructed.

The connector 114 can include pins 402, 404 and 406. The pins 402, 404 and 406 can include or be similar to pins 314 depicted in FIG. 3. For example, pins 314 can include pins 402, 404 and 406. The pins 402, 404 and 406 can vary (e.g., size, length, diameter, shape, or material). For example, pin 402 can be referred to as a long pin 402; pin 404 can be referred to as a short pin 404; and pin 406 can be referred to as a standard pin 406. The long pin 402 can be longer than the short pin 404 and the standard pin 406. The standard pin 406 can be longer than the short pin 404. The different pins 402, 404 and 406 can be used to make different electrical connections or transmit and receive different electrical signals. The different pin configuration can facilitate connecting a cable to the connector 114 in the correct orientation; for example, the configuration, layout and positioning of the different pin sizes can facilitate connecting the cable to the pins in the correct way such that the proper pins are lined up.

Figure 5B:
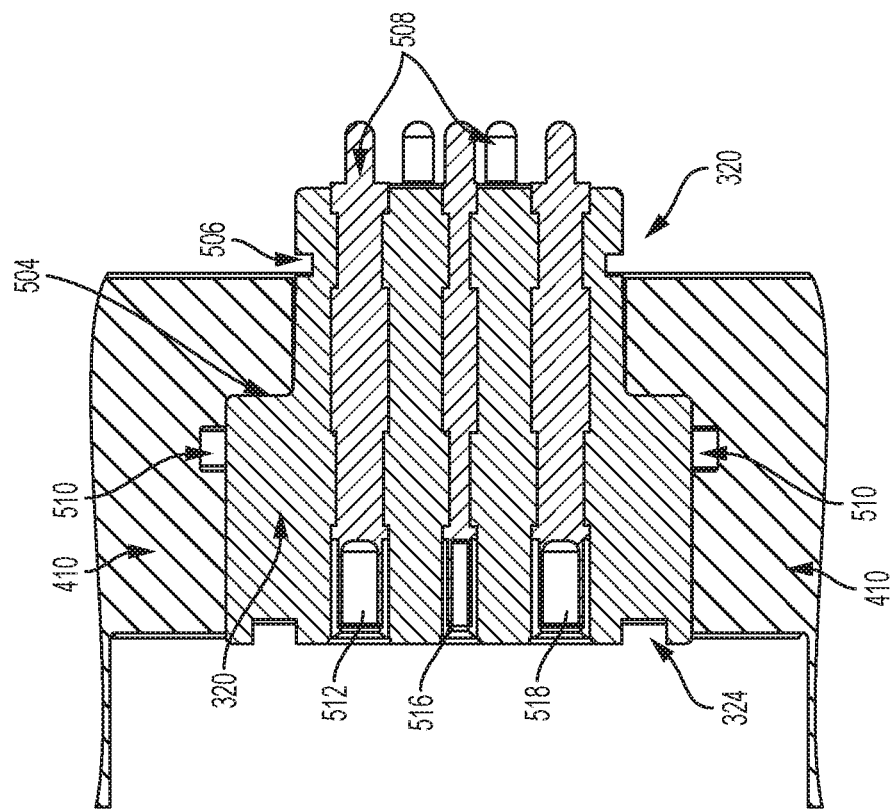
FIG. 5B depicts an illustration of a socket of a seismic data acquisition unit, in accordance with an implementation.
Figure 5A:
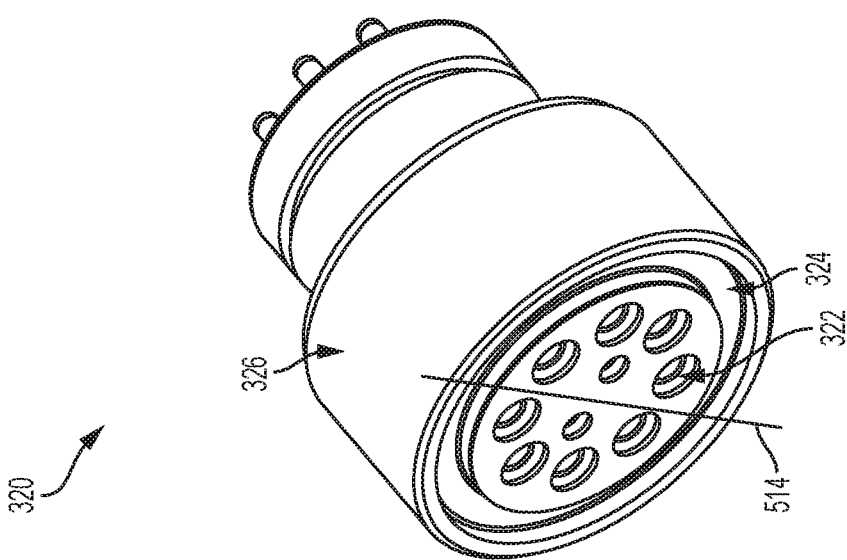
FIG. 5A depicts an illustration of a socket insert of a seismic data acquisition unit, in accordance with an implementation.

FIG. 5A depicts an illustration of a socket insert of a seismic data acquisition unit in accordance with an implementation.

The socket insert component 320 of the cap free subsea connector 114 can be designed to be fully operationally pressure rated in order to provide protection to the main housing 410 should any failure of the pin interconnect 310 or its seal 318 occur. To achieve this, a high pressure (e.g., pressures present at subsea or seabed or ocean floor locations) rated socket connector 320 is provided. The high pressure connectors can be configured with the socket insert 320.

For example, the socket insert 320 can be designed with a close tolerance fit into the housing 410 (e.g., 0.000-0.002 inches at the main O-ring 510, 0.003-0.005 inches behind the shoulder 504) to provide the high pressure rating. This close fit can reduce the moment arm forces and puts the socket insert 320 in almost pure shear stress at the shoulder 504, increasing the overall strength. Sharp radii at the shoulder 504 (e.g., 0.020-0.025 inches) can be avoided to reduce contact stress risers. When the socket insert 320 is made, the socket bodies can be grooved and knurled to bind with the socket insert 320 material, thereby increasing the pressure rating. The main O-ring 510 can sit towards the rear close to the shoulder 504 so that the socket insert 320 is loaded in compression, instead of tension, since the material that can be used can favor compressive loads.

The pin interconnect 310 O-ring seal 324 can be designed to protect the sockets 512, 516 and 518 from the environment and salt water, preventing or mitigating both corrosion and shorting between contacts. Seal surfaces on both the socket insert 320 and the pin interconnect 310 can have a surface finish of 32 micro inches RMS or better.

The socket insert 320 can include a seal surface 326 and an o-ring groove 324. The sockets 322 through which pins 314 can by symmetrical along axis 514. By making the socket 322 layout symmetrical along an axis 514, the seismic data acquisition unit 100 can be oriented with either the first side 102 facing up or the second side 104 facing up and still allow for a cable to connect to the pins 314 that extend through sockets 514. For example, by having the pins 314 layout and sockets 322 symmetrical, it may not be necessary to re-orient the seismic data acquisition unit 100 in order to connect a cable to the connector 114.

FIG. 5B illustrates a socket insert of a seismic data acquisition unit in accordance with an implementation. FIG. 5B illustrates a cross-section view of the socket insert 320 inserted in the seismic data acquisition unit 100. The socket insert 320 can be in contact with housing 410. The socket insert 320 can be surrounded by o-ring grooves 510. The socket insert 320 can include o-ring grooves 324. The socket insert 320 can include sockets 322 that include a first socket 512, second socket 516 and a third socket 518. The first, second and third sockets 512, 516 and 518, respectively, can correspond to long pins 402, short pins 404 and standard pins 406. The sockets 512, 516 and 518 can include a portion that facilitates the insertion of pins 314 (including, for example, pins 402, 404 and 406) without damaging the sockets and while preventing water from entering the sockets 322 and coming into contact with the isolation electronics 330. The sockets 512, 516 and 518 can include a seal, such as a rubber seal, o-ring, gasket or other material to prevent water, dust, or other unwanted substances from entering the socket 322. The socket insert 320 can include a shoulder 504 that forms an edge with respect to housing 410. The socket insert can include a groove 506 in which an o-ring or seal can be placed. The groove 506 can be in between the isolation electronics 330 and the housing 410.

The contacts 508 can connect or contact the isolation electronics 330. The contacts 508 can be configured to secure or couple the socket insert 320 to the isolation electronics 330 or other portion of seismic data acquisition unit 100.

Figure 6B:
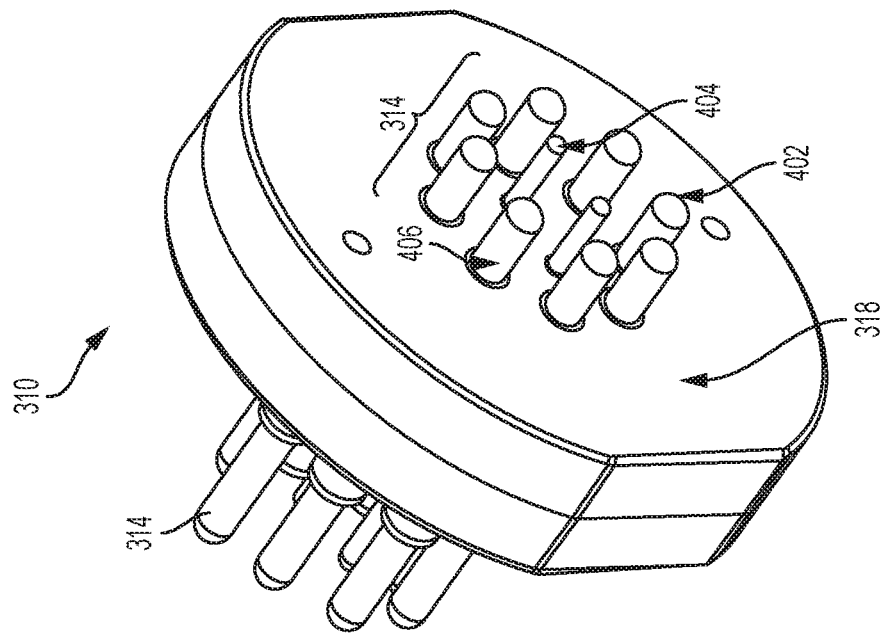
FIG. 6B depicts an illustration of an interconnect of a seismic data acquisition unit, in accordance with an implementation.
Figure 6A:
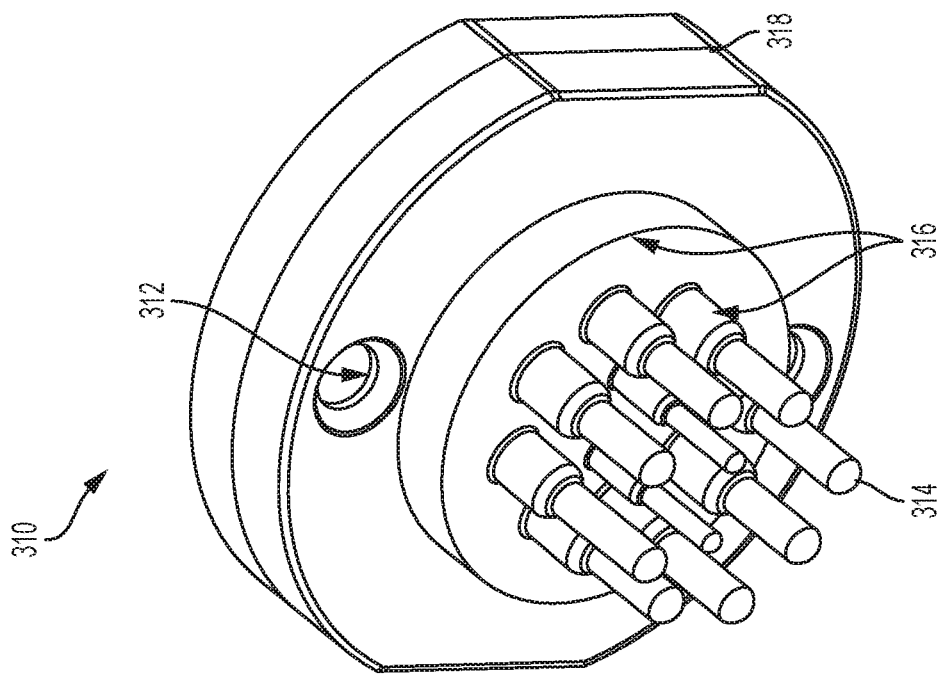
FIG. 6A depicts an illustration of an interconnect of a seismic data acquisition unit, in accordance with an implementation.

FIG. 6A depicts an illustration of an interconnect of a seismic data acquisition unit, in accordance with an implementation. The pin interconnect 310 can include a seal surface 318, opening 312, rubber boot 316, and pins 314. The pin interconnect 310 can connect the internal electronics (e.g., isolation electronics 330, processor, memory, storage, sensors, or battery) of the seismic data acquisition unit 100 to the shipside system. The pin interconnect 310 (or pin interconnect component) of the cap free subsea connector 114 can be made as a separate part in order to facilitate repairs in the field. Without the protective cap, the pins 314 of the pin interconnect 310 can get physically damaged from the harsh environment, corrode with time, or simply wear with use. Since the cap free subsea connector 114 is recessed in the housing 410 of the seismic data acquisition unit 100, the pin interconnect 310 can have two molded-in inserts to facilitate removal.

In a marine environment, water can be present causing electric shorting between the pin contacts 314. To prevent this, a rubber boot 316 present on both the pin interconnect 310 and the shipside mating connector to "squeeze" off the water as the connecting is made and prevent the shorting of the contacts.

The pin interconnect 310 can be retained in the housing 410 using a snap ring 302 as shown in FIG. 3. The snap ring 302 can be made out of a plastic to remove correction effects and functions to compress the O-ring seal in groove 324 between the pin interconnect 310 and the socket insert 320. This compression can seal the connection of the pin interconnect 310 and the socket insert 320 preventing water intrusion and loss of connector function.

Additional features of the pin interconnect 310 that facilitate connectivity with the shipside electronics can include variable length contacts or pins 314 (e.g., pins 402, 404 and 406 depicted in FIG. 4). Some pins can be larger than other pins. The larger pins (or contacts) can be connected to ground, or the shorter pins can be connected to ground. Some pins (or contacts) that are shorter than other pins can be used for the communications link, which may be more sensitive to voltage variations. Using different length pins (e.g., 402, 404 and 406) to contact the grounds first and the communications signal last, the potential difference between the unit electronic and the shipside electronics can be equalized before damage can occur.

Figure 7:
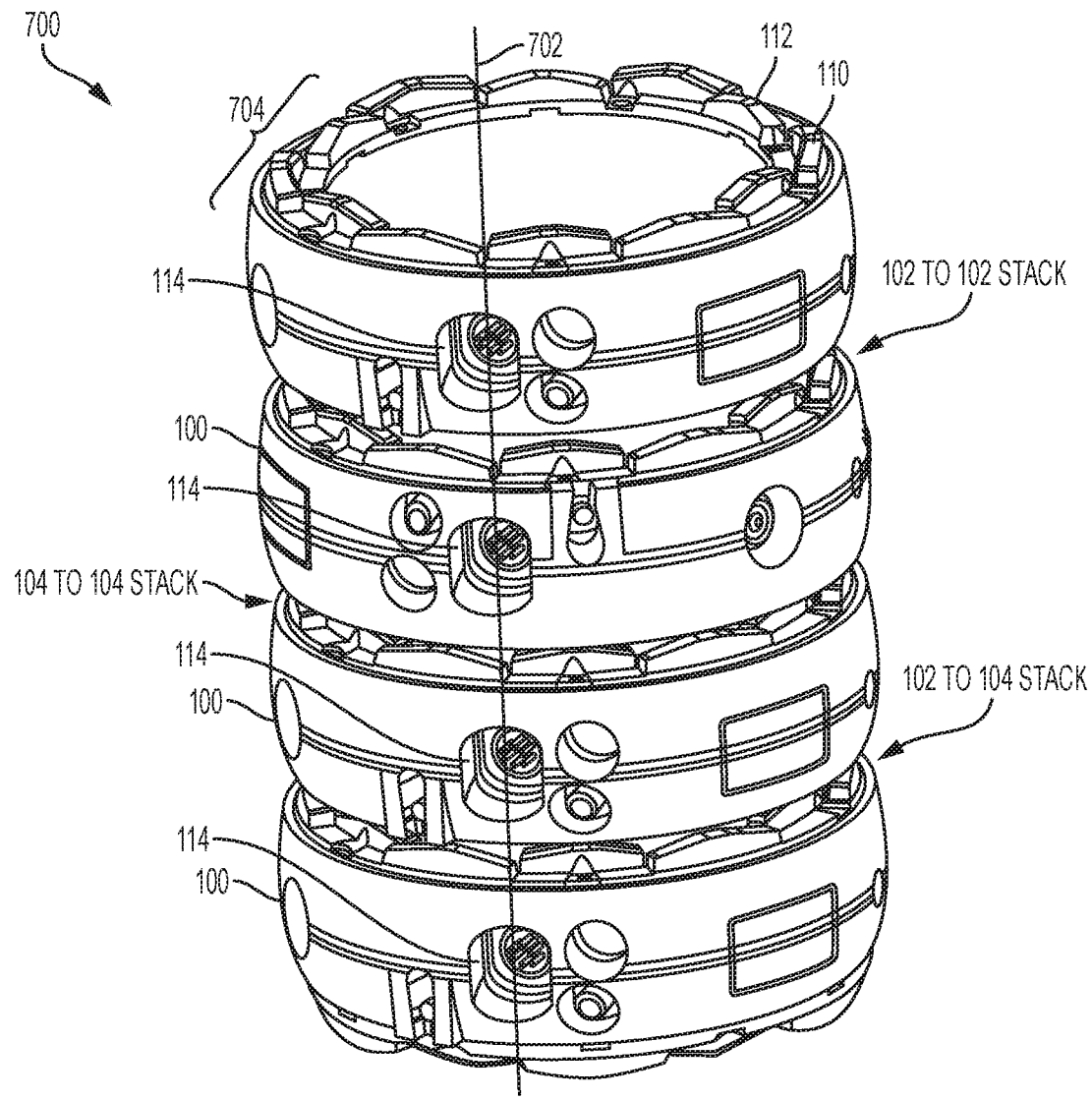
FIG. 7 depicts an illustration of a system to stack seismic data acquisition units, in accordance with an implementation.

FIG. 7 depicts an illustration of a system to stack seismic data acquisition unit, in accordance with an implementation. The system 700 can allow for the storage and deployment of a larger number of seismic data acquisition unit 100, while reducing damage and inefficiencies. The system 700 can allow for orientation free stacking, reliable rotational alignment, automated connection to shipside electronics, high density unit storage, and inventory tracking and management.

The system can support automated connections by the seismic data acquisition unit 100 via features to control both the alignment between seismic data acquisition units 100 and the alignment of the connector 114 to the shipside mating system. To support orientation free stacking and maintain the alignment of the connector 114 with the shipside electronic, a mating or cleat ring 704 can be provided. The cleat ring 704 can provide features to support orientation free stacking as well as features to facility the automation of this stacking. The cleats 704 can also provide quality coupling or contact with the seabed for seismic data acquisition.

The high density storage of seismic data acquisition unit 100 allows the system 700 to increase the number of seismic data acquisition unit 100 that can be stored or deployed, and thereby used in a seismic survey. Seismic data acquisition unit 100 can be stacked in columns. To reduce the complexity of this stacking process, the seismic data acquisition unit 100 can be configured with cleat rings 704 that provide interlocking of the seismic data acquisition unit 100 to be independent of orientation and tolerant of errors in rotational alignment.

The system 700 can include multiple seismic data acquisition unit 100. The cleats 110 and 112 can form a cleat ring 704 that includes inner cleats 112 and outer cleats 110. The cleats 110 and 112 can be offset from one another such that the cleats 110 and 112 do not overlap or do not substantially overlap (e.g., not more than 1%, 2% 5%, 10%, 15%, 20%, 30%, 50%, or 60%). For example, the cleats 110 and 112 can be staggered with one another. The cleat ring 704 with staggered outer cleats 110 and inner cleats 112 can facilitate stacking the seismic data acquisition units 100 on top of each other. For example, top side 102 of a first seismic data acquisition unit 100 can be stacked with the top side 102 of a second seismic data acquisition unit 100. The bottom side 104 of a seismic data acquisition unit 100 can be stacked with a bottom side 104 of another seismic data acquisition unit 100. And a top side 102 of a seismic data acquisition unit 100 can be stacked with a bottom side 104 of another seismic data acquisition unit 100. The seismic data acquisition unit 100 can be stacked such that the cleat ring 704 of a first seismic data acquisition unit 100 is in contact with a cleat ring 704 of the second seismic data acquisition unit 100. The cleat rings 704 of the respective seismic data acquisition unit 100 can interlock one another in order to provide a secure stacking of seismic data acquisition unit 100.

The seismic data acquisition unit 100 can be stacked such that they are symmetrical or lined up along axis 702. By lining up the stack of seismic data acquisition unit 100 along axis 702, the interconnects 114 of each seismic data acquisition unit 100 can also be in alignment, thereby facilitating the connection of the seismic data acquisition unit 100 internal electronics to shipside electronics. Further, the angle of the cleats 110 or 112, spacing, width, length and material can be configured or selected to facilitate stacking two or more seismic data acquisition unit 100.

Figure 8:
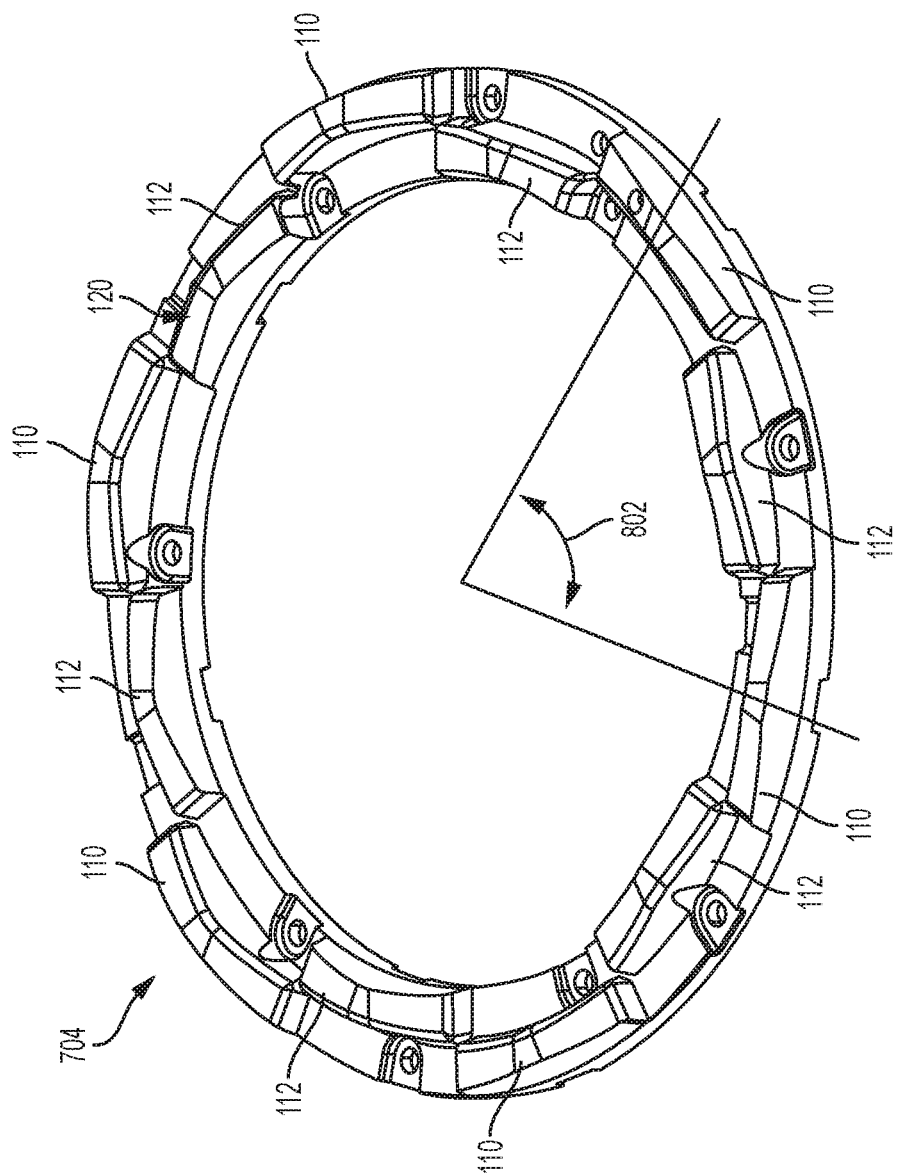
FIG. 8 depicts an illustration of cleat rings of a seismic data acquisition units, in accordance with an implementation.

FIG. 8 depicts an illustration of cleat rings of a seismic data acquisition unit in accordance with an implementation. The cleat rings 704 can include two rings of staggered cleats (e.g., cleats 110 and 112). Each cleat 110 and 112 can include or have slopped sides. The gap between the tops of any two cleats on the same ring can be set at an angle 802 (e.g., 20 to 50 degrees) to allow a rotational alignment error of up to ±15°, for example, when stacking. The slopes 120 on each cleat can allow the seismic data acquisition unit 100 being stacked to be pulled by gravity into the proper coupling position, as shown in FIG. 7, when positioned with an initial rotational error.

With an angle 802, such as 30 degrees, separation between the cleats 110, there are six possible rotational positions in which the seismic data acquisition units 100 could be stacked. One of these positions can allow for proper automated connection with all connectors 114 facing the same direction. Selection of the correct rotational position by the stacking process can be performed by sensing an imbedded magnet in the cleat ring 704 in one of the six cleat mattings locations. Since the cleat ring 704 can be keyed to the seismic data acquisition unit 100 and can be installed in one position, the stacking process can determine the correct amount of rotation to apply in order to achieve the correct stacking, as illustrated in FIG. 7. The system 700 can be configured with various sensing methods, including mechanical or optical sensing techniques. The magnetic sensing techniques can reduce maintenance in a harsh environment because there may be no or few sensors to clean or replace. The alignment of the shipside connection to each seismic data acquisition unit 100 connector 100 can be achieved through a conically shaped housing on the shipside connector with bumpers containing the shipside connector insert. A matching shaped feature in the seismic data acquisition unit 100 bumper 408 can help guide the shipside mating on insertion.

Although there is support for misalignment when stacking, the final position of the stacked units can maintain the necessary tolerance to support the automated connection by the shipside electronics. The cleat ring 704 can be designed to allow rotational movement of the units when stacked to be ±30 degrees or less. This amount of rotational movement is small enough so that a stack of ten units high can still be within the allowable tolerance of the shipside automated connection system.

The cleat ring 704 can be manufactured out of a polymer to provide corrosion resistance and reduce the weight of the unit. The polymer chosen can have high strength, be capable of withstanding high impact shocks, and provide good dimensional stability. Since the cleat rings 704 can be bolted to the housing (e.g., via 210), the polymer can have low creep, such as a high glass content thermoplastic polyurethane or iosplast that can provide these features. Brass inserts (e.g., 212) in the cleat ring 704 can mitigate the creep caused by the bolt 210 tension.

Figure 9:
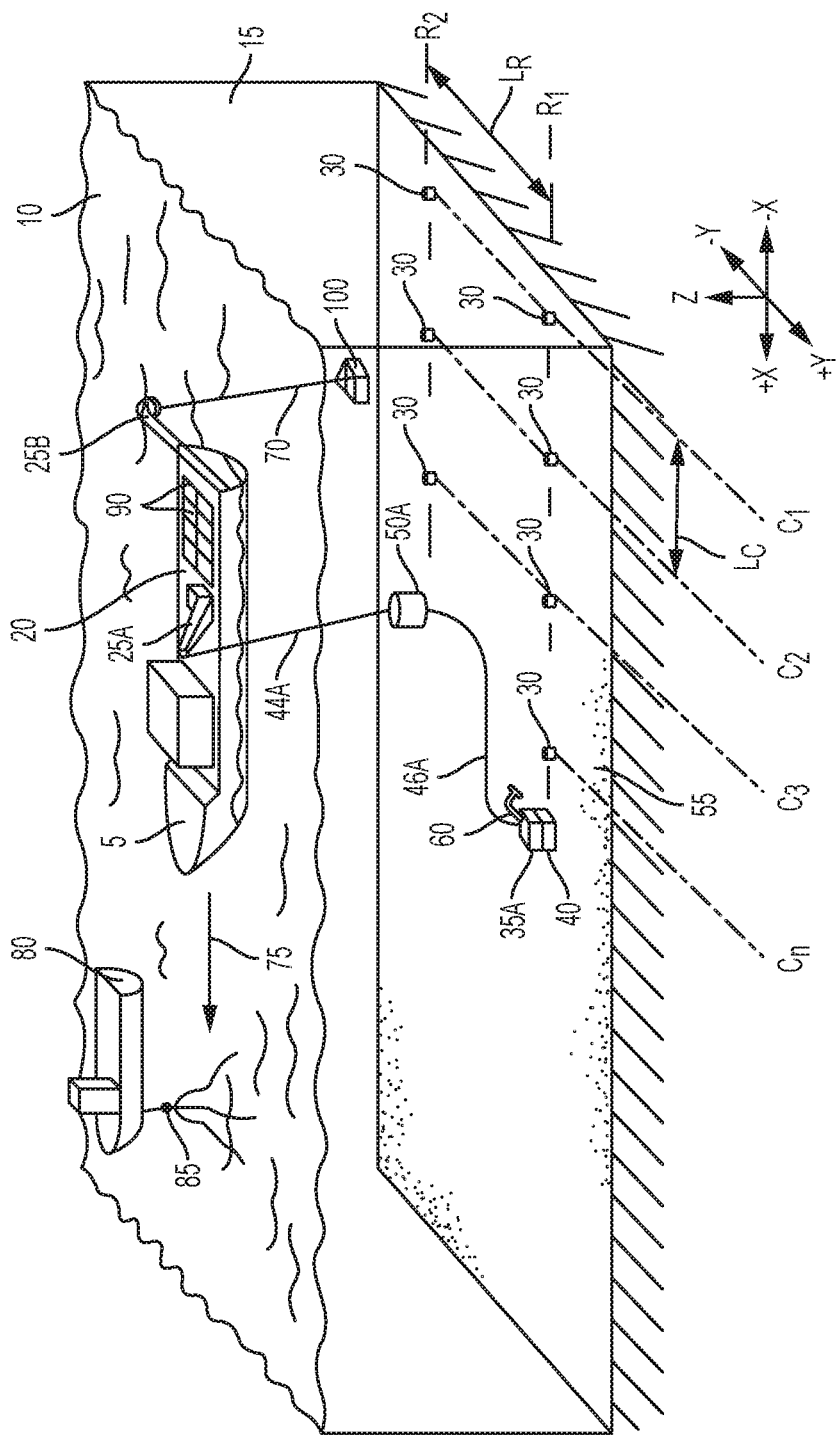
FIG. 9 depicts an isometric schematic view of an example of a seismic operation in deep water.

FIG. 9 is an isometric schematic view of an example of a seismic operation in deep water facilitated by a first marine vessel 5. FIG. 9 is a non-limiting illustrative example of a marine environment in which the systems and methods of the present disclosure can perform a seismic survey or calibrate a geophone and hydrophone pair.

By way of example, FIG. 9 illustrates a first vessel 5 positioned on a surface 10 of a water column 15 and includes a deck 20 which supports operational equipment. At least a portion of the deck 20 includes space for a plurality of sensor device racks 90 where seismic sensor devices (e.g., first device 102) are stored. The sensor device racks 90 may also include data retrieval devices or sensor recharging devices. The vessel 5 can include electronics, such as shipside electronics, that can retrieve seismic data from seismic data acquisition unit 100, perform quality assessment, status checks, or charge a batter of the seismic data acquisition unit 100.

The deck 20 also includes one or more cranes 25A, 25B attached thereto to facilitate transfer of at least a portion of the operational equipment, such as an ROV (e.g., second device 104) or seismic sensor devices (e.g., seismic data acquisition unit 100), from the deck 20 to the water column 15. For example, a crane 25A coupled to the deck 20 is configured to lower and raise an ROV 35A, which transfers and positions one or more sensor devices 30 (which can also be referred to as seismic data acquisition unit 10) on a seabed 55. The seabed 55 can include a lakebed 55, ocean floor 55, or earth 55. The ROV 35A is coupled to the first vessel 5 by a tether 46A and an umbilical cable 44A that provides power, communications, and control to the ROV 35A. A tether management system (TMS) 50A is also coupled between the umbilical cable 44A and the tether 46A. The TMS 50A may be utilized as an intermediary, subsurface platform from which to operate the ROV 35A. For most ROV 35A operations at or near the seabed 55, the TMS 50A can be positioned approximately 50 feet above seabed 55 and can pay out tether 46A as needed for ROV 35A to move freely above seabed 55 in order to position and transfer seismic sensor devices 30 thereon.

A crane 25B may be coupled (e.g., via a latch, anchor, nuts and bolts, screw, suction cup, magnet, or other fastener) to a stern of the first vessel 5, or other locations on the first vessel 5. Each of the cranes 25A, 25B may be any lifting device or launch and recovery system (LARS) adapted to operate in a marine environment. The crane 25B can be coupled to a seismic sensor transfer device 100 by a cable 70. The transfer device 100 may be a drone, a skid structure, a basket, or any device capable of housing one or more sensor devices 30 (or seismic data acquisition unit 100) therein. The transfer device 100 may be a structure configured as a magazine adapted to house and transport one or more sensor devices 30. The transfer device 100 may include an on-board power supply, a motor or gearbox, or a propulsion system 105. The transfer device 100 can be configured as a sensor device storage rack for transfer of sensor devices 30 from the first vessel 5 to the ROV 35A, and from the ROV 35A to the first vessel 5. The transfer device 100 may include an on-board power supply, a motor or gearbox, or a propulsion system 105. Alternatively, the transfer device 100 may not include any integral power devices or not require any external or internal power source. The cable 70 can provide power or control to the transfer device 100. Alternatively, the cable 70 may be an umbilical, a tether, a cord, a wire, a rope, and the like, that is configured solely for support of the transfer device 100.

The ROV 35A can include a seismic sensor device storage compartment 40 that is configured to store one or more seismic sensor devices 30 (e.g., first devices 102) therein for a deployment or retrieval operation. The storage compartment 40 may include a magazine, a rack, or a container configured to store the seismic sensor devices. The storage compartment 40 may also include a conveyor, such as a movable platform having the seismic sensor devices thereon, such as a carousel or linear platform configured to support and move the seismic sensor devices 30 therein. The seismic sensor devices 30 can be deployed on the seabed 55 and retrieved therefrom by operation of the movable platform. The ROV 35A may be positioned at a predetermined location above or on the seabed 55 and seismic sensor devices 30 are rolled, conveyed, or otherwise moved out of the storage compartment 40 at the predetermined location. The seismic sensor devices 30 can be deployed and retrieved from the storage compartment 40 by a robotic device 60, such as a robotic arm, an end effector or a manipulator, disposed on the ROV 35A.

The seismic sensor device 30 (or seismic data acquisition unit 100; or seismic data acquisition unit 100 can include seismic sensor device 30) may be referred to as seismic data acquisition unit 30 or 100 or node 30 or first device 102. The seismic data acquisition unit 30 can record seismic data. The seismic data acquisition unit 30 may include one or more of at least one geophone, at least one hydrophone, at least one power source (e.g., a battery, external solar panel), at least one clock, at least one tilt meter, at least one environmental sensor, at least one seismic data recorder, at least global positioning system sensor, at least one wireless or wired transmitter, at least one wireless or wired receiver, at least one wireless or wired transceiver, or at least one processor. The seismic sensor device 30 may be a self-contained unit such that all electronic connections are within the unit, or one or more components can be external to the seismic sensor device 30. During recording, the seismic sensor device 30 may operate in a self-contained manner such that the node does not require external communication or control. The seismic sensor device 30 may include several geophones and hydrophones configured to detect acoustic waves that are reflected by subsurface lithological formation or hydrocarbon deposits. The seismic sensor device 30 may further include one or more geophones that are configured to vibrate the seismic sensor device 30 or a portion of the seismic sensor device 30 in order to detect a degree of coupling between a surface of the seismic sensor device 30 and a ground surface. One or more component of the seismic sensor device 30 may attach to a gimbaled platform having multiple degrees of freedom. For example, the clock may be attached to the gimbaled platform to minimize the effects of gravity on the clock.

For example, in a deployment operation, a first plurality of seismic sensor devices, comprising one or more sensor devices 30, may be loaded into the storage compartment 40 while on the first vessel 5 in a pre-loading operation. The ROV 35A, having the storage compartment coupled thereto, is then lowered to a subsurface position in the water column 15. The ROV 35A utilizes commands from personnel on the first vessel 5 to operate along a course to transfer the first plurality of seismic sensor devices 30 from the storage compartment 40 and deploy the individual sensor devices 30 at selected locations on the seabed 55. Once the storage compartment 40 is depleted of the first plurality of seismic sensor devices 30, the transfer device 100 is used to ferry a second plurality of seismic sensor devices 30 as a payload from first vessel 5 to the ROV 35A.

The transfer system 100 may be preloaded with a second plurality of seismic sensor devices 30 while on or adjacent the first vessel 5. When a suitable number of seismic sensor devices 30 are loaded onto the transfer device 100, the transfer device 100 may be lowered by crane 25B to a selected depth in the water column 15. The ROV 35A and transfer device 100 are mated at a subsurface location to allow transfer of the second plurality of seismic sensor devices 30 from the transfer device 100 to the storage compartment 40. When the transfer device 100 and ROV 35A are mated, the second plurality of seismic sensor devices 30 contained in the transfer device 100 are transferred to the storage compartment 40 of the ROV 35A. Once the storage compartment 40 is reloaded, the ROV 35A and transfer device 100 are detached or unmated and seismic sensor device placement by ROV 35A may resume. Reloading of the storage compartment 40 can be provided while the first vessel 5 is in motion. If the transfer device 100 is empty after transfer of the second plurality of seismic sensor devices 30, the transfer device 100 may be raised by the crane 25B to the vessel 5 where a reloading operation replenishes the transfer device 100 with a third plurality of seismic sensor devices 30. The transfer device 100 may then be lowered to a selected depth when the storage compartment 40 is reloaded. This process may repeat as until a desired number of seismic sensor devices 30 have been deployed.

Using the transfer device 100 to reload the ROV 35A at a subsurface location reduces the time required to place the seismic sensor devices 30 on the seabed 55, or "planting" time, as the ROV 35A is not raised and lowered to the surface 10 for seismic sensor device reloading. The ROV 35A can synchronize a clock of the node 30 at the time of planting. Further, mechanical stresses placed on equipment utilized to lift and lower the ROV 35A are minimized as the ROV 35A may be operated below the surface 10 for longer periods. The reduced lifting and lowering of the ROV 35A may be particularly advantageous in foul weather or rough sea conditions. Thus, the lifetime of equipment may be enhanced as the ROV 35A and related equipment are not raised above surface 10, which may cause the ROV 35A and related equipment to be damaged, or pose a risk of injury to the vessel personnel.

Likewise, in a retrieval operation, the ROV 35A can utilize commands from personnel on the first vessel 5 to retrieve each seismic sensor device 30 that was previously placed on seabed 55, or collect data from the seismic sensor device 30 without retrieving the device 30. The ROV 35A can adjust the clock of the device 30 while collecting the seismic data. The retrieved seismic sensor devices 30 are placed into the storage compartment 40 of the ROV 35A. In some implementations, the ROV 35A may be sequentially positioned adjacent each seismic sensor device 30 on the seabed 55 and the seismic sensor devices 30 are rolled, conveyed, or otherwise moved from the seabed 55 to the storage compartment 40. The seismic sensor devices 30 can be retrieved from the seabed 55 by a robotic device 60 disposed on the ROV 35A.

Once the storage compartment 40 is full or contains a pre-determined number of seismic sensor devices 30, the transfer device 100 is lowered to a position below the surface 10 and mated with the ROV 35A. The transfer device 100 may be lowered by crane 25B to a selected depth in the water column 15, and the ROV 35A and transfer device 100 are mated at a subsurface location. Once mated, the retrieved seismic sensor devices 30 contained in the storage compartment 40 are transferred to the transfer device 100. Once the storage compartment 40 is depleted of retrieved sensor devices, the ROV 35A and transfer device 100 are detached and sensor device retrieval by ROV 35A may resume. Thus, the transfer device 100 is used to ferry the retrieved seismic sensor devices 30 as a payload to the first vessel 5, allowing the ROV 35A to continue collection of the seismic sensor devices 30 from the seabed 55. In this manner, sensor device retrieval time is significantly reduced as the ROV 35A is not raised and lowered for sensor device unloading. Further, safety issues and mechanical stresses placed on equipment related to the ROV 35A are minimized as the ROV 35A may be subsurface for longer periods.

For example, the first vessel 5 can travel in a first direction 75, such as in the +X direction, which may be a compass heading or other linear or predetermined direction. The first direction 75 may also account for or include drift caused by wave action, current(s) or wind speed and direction. The plurality of seismic sensor devices 30 can be placed on the seabed 55 in selected locations, such as a plurality of rows Rn in the X direction (R1 and R2 are shown) or columns Cn in the Y direction (C1-Cn are shown), wherein n equals an integer. The rows Rn and columns Cn can define a grid or array, wherein each row Rn (e.g., R1-R2) comprises a receiver line in the width of a sensor array (X direction) or each column Cn comprises a receiver line in a length of the sensor array (Y direction). The distance between adjacent sensor devices 30 in the rows is shown as distance LR and the distance between adjacent sensor devices 30 in the columns is shown as distance LC. While a substantially square pattern is shown, other patterns may be formed on the seabed 55. Other patterns include non-linear receiver lines or non-square patterns. The pattern(s) may be pre-determined or result from other factors, such as topography of the seabed 55. The distances LR and LC can be substantially equal and may include dimensions between about 60 meters to about 400 meters, or greater. The distance between adjacent seismic sensor devices 30 may be predetermined or result from topography of the seabed 55 as described above.

The first vessel 5 is operated at a speed, such as an allowable or safe speed for operation of the first vessel 5 and any equipment being towed by the first vessel 5. The speed may take into account any weather conditions, such as wind speed and wave action, as well as currents in the water column 15. The speed of the vessel may also be determined by any operations equipment that is suspended by, attached to, or otherwise being towed by the first vessel 5. For example, the speed can be limited by the drag coefficients of components of the ROV 35A, such as the TMS 50A and umbilical cable 44A, as well as any weather conditions or currents in the water column 15. As the components of the ROV 35A are subject to drag that is dependent on the depth of the components in the water column 15, the first vessel speed may operate in a range of less than about 1 knot. In examples where two receiver lines (rows R1 and R2) are being laid, the first vessel includes a first speed of between about 0.2 knots and about 0.6 knots. In some implementations, the first speed includes an average speed of between about 0.25 knots, which includes intermittent speeds of less than 0.25 knots and speeds greater than about 1 knot, depending on weather conditions, such as wave action, wind speeds, or currents in the water column 15.

During a seismic survey, one receiver line, such as row R1 may be deployed. When the single receiver line is completed a second vessel 80 can be used to provide a source signal. In some cases, the first vessel or other device can provide the source signal. The second vessel 80 is provided with a source device or acoustic source device 85, which may be a device capable of producing acoustical signals or vibrational signals suitable for obtaining the survey data. The source signal propagates to the seabed 55 and a portion of the signal is reflected back to the seismic sensor devices 30. The second vessel 80 may be required to make multiple passes, for example at least four passes, per a single receiver line (row R1 in this example). During the time the second vessel 80 is making the passes, the first vessel 5 continues deployment of a second receiver line. However, the time involved in making the passes by the second vessel 80 is much shorter than the deployment time of the second receiver line. This causes a lag time in the seismic survey as the second vessel 80 sits idle while the first vessel 5 is completing the second receiver line.

The first vessel 5 can use one ROV 35A to lay sensor devices to form a first set of two receiver lines (rows R1 and R2) in any number of columns, which may produce a length of each receiver line of up to and including several miles. The two receiver lines (rows R1 and R2) can be substantially (e.g., within +/−10 degrees) parallel. When a single directional pass of the first vessel 5 is completed and the first set (rows R1, R2) of seismic sensor devices 30 are laid to a predetermined length, the second vessel 80, provided with the source device 85, is utilized to provide the source signal.

The second vessel 80 can make eight or more passes along the two receiver lines to complete the seismic survey of the two rows R1 and R2.

While the second vessel 80 is shooting along the two rows R1 and R2, the first vessel 5 may turn 180 degrees and travel in the X direction in order to lay seismic sensor devices 30 in another two rows adjacent the rows R1 and R2, thereby forming a second set of two receiver lines. The second vessel 80 may then make another series of passes along the second set of receiver lines while the first vessel 5 turns 180 degrees to travel in the +X direction to lay another set of receiver lines. The process may repeat until a specified area of the seabed 55 has been surveyed. Thus, the idle time of the second vessel 80 is minimized as the deployment time for laying receiver lines is cut approximately in half by deploying two rows in one pass of the vessel 5.

Although only two rows R1 and R2 are shown, the sensor device 30 layout is not limited to this configuration as the ROV 35A may be adapted to layout more than two rows of sensor devices in a single directional tow. For example, the ROV 35A may be controlled to lay out between three and six rows of sensor devices 30, or an even greater number of rows in a single directional tow. The width of a "one pass" run of the first vessel 5 to layout the width of the sensor array can be limited by the length of the tether 46A or the spacing (distance LR) between sensor devices 30.

FIG. 10 depicts a block diagram of an architecture for a computing system employed to implement various elements of the data processing system to perform the functions depicted in FIGS. 1-9. FIG. 10 is a block diagram of a data processing system including a computer system 1000 in accordance with an embodiment. The computer system can include or execute a coherency filter component. The data processing system, computer system or computing device 1000 can be used to implement one or more component configured to filter, translate, transform, generate, analyze, or otherwise process the data or signals depicted in FIGS. 1-7. The computing system 1000 includes a bus 1005 or other communication component for communicating information and a processor 1010a-n or processing circuit coupled to the bus 1005 for processing information. The computing system 1000 can also include one or more processors 1010 or processing circuits coupled to the bus for processing information. The computing system 1000 also includes main memory 1015, such as a random access memory (RAM) or other dynamic storage device, coupled to the bus 1005 for storing information, and instructions to be executed by the processor 1010. Main memory 1015 can also be used for storing seismic data, binning function data, images, reports, tuning parameters, executable code, temporary variables, or other intermediate information during execution of instructions by the processor 1010. The computing system 1000 may further include a read only memory (ROM) 1020 or other static storage device coupled to the bus 1005 for storing static information and instructions for the processor 1010. A storage device 1025, such as a solid state device, magnetic disk or optical disk, is coupled to the bus 1005 for persistently storing information and instructions.

The computing system 1000 may be coupled via the bus 1005 to a display 1035 or display device, such as a liquid crystal display, or active matrix display, for displaying information to a user. An input device 1030, such as a keyboard including alphanumeric and other keys, may be coupled to the bus 1005 for communicating information and command selections to the processor 1010. The input device 1030 can include a touch screen display 1035. The input device 1030 can also include a cursor control, such as a mouse, a trackball, or cursor direction keys, for communicating direction information and command selections to the processor 1010 and for controlling cursor movement on the display 1035.

The processes, systems and methods described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement may also be employed to execute the instructions contained in main memory 1015. In some embodiments, hard-wired circuitry may be used in place of or in combination with software instructions to effect illustrative implementations. Thus, embodiments are not limited to any specific combination of hardware circuitry and software.

Although an example computing system has been described in FIG. 10, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to perform a seismic survey, comprising:
a seismic data acquisition unit comprising:
 a first connector positioned at a first portion of the seismic data acquisition unit, the first connector comprising a first snap ring, a first pin interconnect separate from the first snap ring, and a first socket insert separate from the first snap ring and the first pin interconnect; and
 a set of first cleats forms a first cleat ring and a set of second cleats forms a second cleat ring, the set of first cleats is positioned on a perimeter of the seismic data acquisition unit, and the set of second cleats is positioned in proximity to the set of first cleats, and the first cleats and the second cleats are offset from each other, wherein an overlapping portion of the first cleats and the second cleats is less than 60%,
 the first snap ring to contact the first pin interconnect and lock the first pin interconnect in contact with the first socket insert, the first pin interconnect comprising one or more pins to contact an aqueous medium, a seal surface, and a rubber boot to prevent contact between the aqueous medium and the first socket insert; and
 the first socket insert to contact electronic circuitry located within the seismic data acquisition unit.

2. The system of claim 1, wherein the first connector is configured for underwater deployment absent a cap.

3. The system of claim 1, wherein the first snap ring is configured to be placed into a groove of a housing of the seismic data acquisition unit.

4. The system of claim 1, wherein the first snap ring having a shape based on one of a ring or a horseshoe design.

5. The system of claim 1, wherein the first snap ring further comprises at least one protrusion or at least one opening to lock the first snap ring to the first pin interconnect in contact with the first socket insert.

6. The system of claim 1, wherein the first pin interconnect further comprises the one or more pins having at least two different sizes in a symmetrical layout to provide a connection in 180 degree orientations.

7. The system of claim 1, wherein the rubber boot dispels water as the first connector is connected to a shipside mating connector.

8. The system of claim 1, wherein the rubber boot dampens a force resulting from a cable that connects to the one or more pins of the first pin interconnect, the rubber boot configured to deform responsive to the force.

9. The system of claim 1, wherein the first pin interconnect further comprises replaceable pins.

10. The system of claim 1, wherein the first pin interconnect further comprises an opening in which a removal tool is inserted to replace the first pin interconnect, the removal tool to detach the first pin interconnect from the first socket insert.

11. The system of claim 1, further comprising a second connector positioned at a second portion of the seismic data acquisition unit, the second connector comprising a second snap ring, a second pin interconnect, and a second socket insert.

12. The system of claim 1, wherein the first pin interconnect is separate from the first snap ring, and the first socket insert is separate from the first snap ring and the first pin interconnect.

13. The system of claim 1, further comprising:
a transceiver positioned at a third portion of the seismic data acquisition unit, the transceiver configured to transmit or receive acoustic or radio frequency signals.

14. A method of performing a seismic survey, comprising:
providing, on a marine vessel, a seismic data acquisition unit comprising:
 a first connector positioned at a first portion of the seismic data acquisition unit, the first connector comprising a first snap ring, a first pin interconnect separate from the first snap ring, and a first socket insert separate from the first snap ring and the first pin interconnect; and
 a set of first cleats forms a first cleat ring and a set of second cleats forms a second cleat ring, the set of first cleats is positioned on a perimeter of the seismic data acquisition unit, and the set of second cleats is positioned in proximity to the set of first cleats, and the first cleats and the second cleats are offset from each other, wherein an overlapping portion of the first cleats and the second cleats is less than 60%,
 the first snap ring to contact the first pin interconnect and lock the first pin interconnect in contact with the first socket insert, the first pin interconnect comprising one or more pins to contact an aqueous medium, a seal surface, and a first rubber boot to prevent contact between the aqueous medium and the first socket insert; and
 the first socket insert to contact electronic circuitry located within the seismic data acquisition unit.

15. The method of claim 14, further comprising:
retrieving the seismic data acquisition unit from the aqueous medium; and
connecting a first cable having a shipside mating connector to the one or more pins of the first pin interconnect, wherein the first rubber boot on the first pin interconnect dispels water as the first cable is connected and dampens a force resulting from the first cable that connects to the one or more pins of the first pin interconnect, the first rubber boot configured to deform responsive to the force.

16. The method of claim 14, further comprising:
retrieving the seismic data acquisition unit from the aqueous medium;
detaching, via a removal tool, the first snap ring to unlock the first pin interconnect in contact with the first socket insert; and
replacing the first pin interconnect with a second pin interconnect.

17. The method of claim 14, wherein the seismic data acquisition unit further comprises a second connector positioned at a second portion of the seismic data acquisition unit, further comprising:
- retrieving the seismic data acquisition unit from the aqueous medium; and
- connecting a second cable having a second shipside mating connector to one or more pins of a second pin interconnect of the second connector, wherein a second rubber boot on the pin interconnect dispels water as the second cable is connected.

18. The method of claim 14, further comprising:
- deploying, from the marine vessel, the seismic data acquisition unit in the aqueous medium to transmit or receive acoustic or radio frequency signals using a transceiver positioned at a third portion of the seismic data acquisition unit.

19. The method of claim 14, wherein the first pin interconnect further comprises the one or more pins having at least two different sizes in a symmetrical layout to provide a connection in 180 degree orientations.

20. The method of claim 14, wherein the first pin interconnect further comprises replaceable pins, further comprising:
- retrieving the seismic data acquisition unit from the aqueous medium; and
- replacing the replaceable pins of the first pin interconnect with second replaceable pins.

\* \* \* \* \*